2,991,221
UREA-ETHYLENE DIBROMIDE ADDUCTS

Burl E. Bryant and George B. Truchelut, Lake Jackson, and Harry R. Hudgins, Beaumont, Tex., assignors to The Dow Chemical Company, Midland, Mich., a corporation of Delaware
No Drawing. Filed May 15, 1959, Ser. No. 813,362
7 Claims. (Cl. 167—22)

The present invention is concerned with new compositions of matter and their use in agriculture. More particularly, it is concerned with solid adducts comprising urea and ethylene dibromide and their use as fumigants.

Ethylene dibromide is a highly toxic, highly corrosive and highly irritating liquid which has found considerable use in agriculture as a soil fumigant particularly for the control of nematodes. Because there are handling hazards associated with ethylene dibromide, marketing and soil fumigation with ethylene dibromide presently require use of special containers, pumps, hoses and metering devices as well as protective clothing for the operators. These properties have heretofore restricted the use of ethylene dibromide, especially by farmers carrying out relatively small scale operations and for home gardeners. A further difficulty is directly attributable to the flow characteristics of ethylene dibromide and liquid compositions thereof. These compositions are of such low viscosity that, when applied to soil around the plants, the liquid tends to absorb quickly into the ground and to flow into fissures and soil cracks whereby the root system of the plant is exposed to lethal concentrations of the toxicant. Such inability to control the distribution of the toxicant may result in severe injury with eventual destruction of plants by amounts well within normal tolerance limits. The need for a simple and effective means for soil fumigation which is free from the hazards generally associated therewith and which is adaptable to a small scale operation is generally recognized by agriculturalists.

It is an object of the present invention to provide new chemical compositions. A further object is to provide a new method for fumigation. A still further object is to provide for a new method for treating soil. Another object is to provide a method for the control of soil parasites. An additional object is the provision of novel compositions to be employed in the new method for treating soil. Other objects will become apparent from the following specification and claims.

The adducts comprising urea and ethylene dibromide are white crystalline compositions containing varying contents of ethylene dibromide. Included within the scope of the invention are crystalline adducts which contain in addition to urea and ethylene dibromide, a normal alkane. Adducts may be prepared containing up to about 31 percent by weight of ethylene dibromide. For most uses of the adduct, it is desirable that the ethylene dibromide content in the adduct be at least 2 percent. These adducts have an odor of the ethylene dibromide present in the crystalline structure. The adducts are extremely soluble in water but on dissolving, the ethylene dibromide separates with the formation of an oily phase. The ethylene dibromide is extractable from the adducts by repeated washing with ether or other solvents which have selective solvent action toward ethylene dibromide. On prolonged heating the solid complex adduct decomposes with the liberation of the ethylene dibromide.

The adducts of the present invention may be prepared by merely contacting urea with ethylene dibromide in the presence of a solvent such as methanol, ethanol or isopropyl alcohol. Any proportion of the components may be employed. Thus, from about 0.5 to 5 molar proportions of ethylene dibromide may be employed for each molar proportion of urea. The larger proportion of ethylene dibromide produces an adduct having a higher proportion of ethylene bromide in the adduct. The reaction may be carried out at a temperature in the range of from about 5° to about 70° C. In the preparation of the adduct which does not contain a normal-alkane, it is preferred that a temperature range of from 5° to about 15° C. be employed.

A further modification of the present invention is an adduct of urea and ethylene dibromide which also contains a normal-alkane in the crystalline structure. This modified adduct is of greater stability, i.e., retains the ethylene dibromide in its crystalline adduct complex for a longer period than the adduct of urea and ethylene dibromide without the addition of the normal-alkane. In the preparation of such adducts, it is preferred that the normal-alkane contain from about 8 to 20 carbon atoms. A modified adduct may be prepared containing from 5 to 30 percent by weight of ethylene dibromide and from 1 to 10 percent by weight of normal-dodecane. When an adduct is prepared which contains a normal-alkane in its crystalline structure, the preparation is carried out preferably at a temperature of from about 5° to 15° C. It has further been found that it is critical and essential to the stability of the resulting adduct that the urea and the ethylene dibromide be mixed together prior to the addition of the normal-alkane. The amount of normal-alkane employed in the preparation may be from about 0.01 to 0.1 molar proportion of the amount of urea employed.

In carrying out the preparation for the urea-ethylene dibromide adduct without added normal-alkane, the ethylene dibromide is added portionwise to a hot, saturated solution of urea in suitable solvent. The mixture is then allowed to cool to room temperature whereupon the desired adduct precipitates as a crystalline solid. The latter may then be recovered by filtration and purified, if desired, by washing with a saturated alcohol solution of urea.

In the preparation of the urea-ethylene dibromide adduct containing a normal-alkane, finely powdered urea is added to a solution of ethylene dibromide in an appropriate solvent such as lower aliphatic alcohol at a temperature of from about 5° to 15° C. The mixture is stirred for a period of from about 15 minutes to 1 hour. Thereafter the normal-alkane is added to the mixture and the stirring continued for an additional 15 minutes to 1 hour to produce a normal-alkane modified urea-ethylene dibromide adduct product. The latter may then be recovered by filtration and washed, if desired, by a urea-saturated solvent solution.

The following examples illustrate the present invention but are not to be construed as limiting.

EXAMPLE 1

*Urea-ethylene dibromide adduct*

Urea was added to 50 milliliters of boiling methanol to produce a saturated solution of urea in methanol. About 30 grams (0.5 mole) of urea was required. 100 grams (0.6 mole) ethylene dibromide was added portionwise to the resulting hot solution and agitated to produce a homogeneous solution. The clear solution was allowed to cool to room temperature whereupon white crystals of the urea-ethylene dibromide adduct product precipitated in the reaction mixture. The product was recovered by filtration and had a density of 1.516. Analysis of the crystals showed the adduct to contain 31 percent ethylene dibromide.

EXAMPLE 2

In similar preparations, the following urea-ethylene dibromide adducts are prepared:

Urea-ethylene dibromide adduct containing 10 percent by weight of ethylene dibromide by contacting 1 molar proportion of urea with approximately 0.03 molar proportion of ethylene dibromide.

Urea-ethylene dibromide adduct containing 19 percent by weight of ethylene dibromide by contacting 1 molar proportion of urea with approximately 0.06 molar proportion of ethylene dibromide.

EXAMPLE 3

*Normal-dodecane modified urea-ethylene dibromide*

400 grams (2.13 moles) of ethylene dibromide and 40 grams of methanol were cooled to 5° C. and 100 grams (1.67 moles) of pulverized urea added thereto with stirring. Stirring was continued for 30 minutes while the temperature was maintained at 5° C. Thereafter, 10 grams (0.057 mole) of normal-dodecane was added to the mixture and the stirring continued for 30 minutes to produce a normal-dodecane modified urea-ethylene dibromide adduct product. The latter was recovered by filtration and washing with 50 milliliters of methanol which had been saturated with urea. The product had an ethylene dibromide content of 21.3 percent. The density of the crystalline product was 1.458.

The resulting product was found to have greatly increased stability with respect to the amount of ethylene dibromide retained in the crystalline structure over an extended period of time.

EXAMPLE 4

In preparations carried out in a similar manner, the following normal-alkane modified urea-ethylene dibromide adducts are prepared:

Normal-octane modified urea-ethylene dibromide adduct from urea, ethylene dibromide and normal-octane.

Normal-decane modified urea-ethylene dibromide adduct from urea, ethylene dibromide and normal-decane.

Normal-octadecane modified urea-ethylene dibromide adduct from urea, ethylene dibromide and normal-octadecane.

Normal-eicosane modified urea-ethylene dibromide adduct from urea, ethylene dibromide and normal-eicosane.

The adduct products of the present invention have numerous utilities. Certain of these utilities are dependent solely on the formation of an adduct while certain other utilities comprise an improved use for the known uses of ethylene dibromide.

Illustrative of the utilities dependent on adduct formation, per se, is the use of adduct formation to separate ethylene dibromide from other mono- and polyhalogen compounds such as those derived from 2-methylpropane or 2-methylbutane or those having nitro-, carboxy-, hydroxy-, amino- or other substituents, as well as from more highly hologenated hydrocarbons such as tetrabromoethane or carbon tetrabromide. These mixtures of hydrocarbons are frequently found in many processes involving the synthesis or use of halogenated hydrocarbons and oftentimes require separation. In many cases where conventional procedures such as distillation is impractical, the adducts of the present invention provide a practical means for the separation of ethylene dibromide from the other polyhalogen compounds.

It has also been discovered that by employing the new adducts comprising ethylene dibromide and urea, good control of nematodes and other parasites infesting soil may be obtained. It has been found that the composition is readily handled as a dry powder or in pellet form requiring no specialized equipment for administration. In addition, it has been found that it may be readily formulated for application with a standard fertilizer drill used in small as well as in large scale operations. Furthermore, by reason of its physical nature, it is impossible for the new composition to soak or run into soil cracks so that injury to the root system of the plant is minimized. When the adducts of the present invention are applied to soil, the ethylene ethylene bromide is slowly released from the adducts and effectively kills nematodes and other undesirable pest species. By use of the adducts of the present invention, it is possible to maintain in the critical area an effective concentration of toxicant over a longer period than when an unmodified liquid fumigant or composition thereof is employed. The adducts of the present invention have an added advantage when employed as a soil fumigant, that when incorporated in the soil, the urea remaining after release of the polyhaloalkane serves as fertilizer to be utilized by plants as a source of nitrogen. Thus, the invention provides a method for simultaneous application of fertilizer and fumigant to the soil. In such applications where the adduct is prepared at a time substantially prior to use, the urea-ethylene dibromide adduct containing a normal-alkane has the added advantage of providing a more sutiable composition for shelf storage and transportation, particularly under conditions where summer temperatures are encountered.

The practice of this invention may be accomplished by simply admixing an adduct comprising urea and ethylene dibromide in soil. The adduct may also be employed in inert (non-toxicant) solid carriers if its dilution or extention is helpful in application against any pest. Suitable solid carriers include talc, chalk, gypsum, vermiculite, bentonite, fuller's earth, attapulgite and other clays, solid detergents and sand. In addition, solid fertilizer materials supplying phosphorus, potassium and other nutrients may be admixed with the adducts of the present invention. Compositions of adducts in inert carriers may contain from 0.001 percent to greater than 95 percent by weight of adduct. Preferred compositions are adducts in sand, attaclay granules, gypsum granules or nitrogen-free prilled fertilizers. Such compositions generally contain from 5 to 75 percent by weight of adduct. The adduct with or without a powder carrier may be applied as a dust to the dry surface of the soil of land which has been prepared for planting and then immediately plowed in; or the adduct or a mixture thereof with inert powder carrier with or without sand may be applied in soil such as in furrows and thereafter covered with soil. Alternatively, the adduct with or without inert adjuvants may be applied to soil with standard equipment for drilling dry fertilizers. In application by non-professional people, such as home gardeners, the adduct may be spread on the surface of the soil and tilled in, or furrows may be made in the garden plot, the adduct with or without carrier applied at the bottom of the furrow, then covered with soil and rolled.

In application to soil the adduct may be applied in an amount sufficient to supply 10 to 60 pounds of ethylene dibromide per acre at a depth of from 5 to 15 inches. An amount of adduct sufficient to supply from 20 to 40 pounds of ethylene dibromide per acre foot is considered preferable. In its use as a soil fumigant, it is preferred that the adduct product be administered to soil when the soil has a temperature of 60° F. to 90° F. and a moisture content of from 5 to 15 percent. The exact amount of the adduct comprising urea and ethylene dibromide to be employed for a particular dosage depends on the ethylene dibromide content of the adduct and may be readily determined therefrom.

The control of soil parasites by the administration of the adducts comprising urea and ethylene dibromide is illustrated by the following examples.

EXAMPLE 5

0.145 gram of the urea-ethylene dibromide adduct having an ethylene dibromide content of about 10 percent was intimately admixed into 300 grams of nematode-infested soil having a moisture content of about 10 to 15 percent. This corresponds to a dosage of about 20 pounds per acre foot or 10 pounds per acre furrow slice of 6 inch depth. The treated mixture was then placed in closed containers. One duplicate set of containers was allowed to stand for 7 days in a greenhouse having a day temperature of 80° to 85° F. and a night temperature of about 75° F. As a check operation, 300 grams of untreated nematode-infested soil was also placed in a closed container and allowed to stand for 7 days in the greenhouse. At the end of this period, the containers were opened, the soil thoroughly mixed and the soil taken and treated by "The Funnel Method After Baermann" to separate live nematodes. This method is described in "A Manual of Agricultural Helminthology" by I. N. Filipjev and J. H. Schuurmans (1941, page 181). In such a method, the nose of a funnel is provided with a short rubber tube and a clamp. The soil aliquot is placed on a piece of soft, absorbent paper in the opening of the funnel which has been nearly filled with water. The live nematodes wriggle out of the soil samples and into the water in the rubber tube on the nose of the funnel where they are retained. Twenty-four hours following the initiation of the Baermann treatment, the fluid in the rubber tube was examined microscopically and counts of nematodes made. The results obtained were as follows:

Soil:

| | Number of live active nematodes (average of 2-replications), 7 days |
|---|---|
| Treated | 0 |
| Untreated check | 2550 |

EXAMPLE 6

A field of silty loam soil heavily infested with nematodes having a soil moisture of about 11.58 percent and a soil temperature of about 90° F. was tilled to a depth of 6 inches. Thereafter, the field was bedded into rows and each bed furrowed. A mixture of about 50 parts by weight of solid urea-ethylene dibromide adduct having an ethylene dibromide content of 24 percent by weight and 50 parts by weight of sand was sifted into the bottom of the furrows at dosage rates based on ethylene dibromide of (a) 30 pounds per acre for fumigating 12 inch band in 40–42 inch row spacing, and (b) 60 pounds per acre for fumigating in 12 inch band in 40–42 inch row spacing. The furrows were immediately covered with excavated soil and the beds were then rolled to pack the surface soil and to press the fumigant to a final depth of 5 inches. Nematode counts were then made at 5 days and 12 days after application by taking duplicate samples of 300 grams from a position 1 inch below and 6 inches to one side of the line of application. It was found that good commercial controls of nematodes were obtained in the soil treated with the urea-ethylene dibromide adduct.

The urea-ethylene dibromide adduct in the operations above described supplied (1) 44.3 pounds of nitrogen per acre simultaneously with 30 pounds of ethylene dibromide per acre and (2) 88.6 pounds of nitrogen per acre simultaneously with 60 pounds of ethylene dibromide per acre. These amounts when translated into broadcast basis, with ethylene dibromide distributed in 12 inch centers correspond to 155 pounds per acre of nitrogen at an ethylene dibromide dosage rate of 105 pounds per acre and 310 pounds of nitrogen per acre at an ethylene dibromide dosage rate of 210 pounds per acre.

In similar operations, carried out with urea-ethylene dibromide adduct modified with normal-dodecane, good controls of nematodes are also obtained.

We claim:
1. A solid crystalline adduct comprising urea and ethylene dibromide.
2. A solid crystalline adduct comprising urea and ethylene dibromide, containing in said solid crystalline structure a normal-alkane containing from 8 to 20 carbon atoms.
3. A process for forming a solid adduct comprising urea and ethylene dibromide which comprises contacting urea with ethylene dibromide in an alcoholic solvent in the temperature range of from about 5° to 70° C. to form a solid complex thereof, cooling to precipitate the solid adduct as a crystalline solid and recovering same from the reaction mixture.
4. A process for forming a solid crystalline adduct comprising urea and ethylene dibromide containing normal-alkane in said solid crystalline structure which comprises contacting urea with ethylene dibromide in an alcoholic solvent in the temperature range of from about 5° to 15° C., adding the normal-alkane thereto to obtain the adduct as a crystalline solid and recovering same from the reaction mixture.
5. A fumigant composition comprising a solid adduct comprising urea and ethylene dibromide in a carrier.
6. A method for soil fumigation comprising dispersing through soil a solid adduct comprising ethylene dibromide and urea.
7. A method for treating soil to control nematodes which comprises introducing into soil a solid adduct comprising ethylene dibromide and urea.

References Cited in the file of this patent

UNITED STATES PATENTS

| 2,473,984 | Bickerton | June 21, 1949 |
| 2,600,431 | Rosenstein | June 17, 1952 |

OTHER REFERENCES

Agr. Chem., vol. 7, No. 11, November 1952, p. 39.